United States Patent
Wu

(10) Patent No.: US 8,295,265 B2
(45) Date of Patent: Oct. 23, 2012

(54) METHOD FOR HANDLING RADIO BEARER MESSAGES DURING RESET AND REESTABLISHMENT IN A WIRELESS SYSTEM

(75) Inventor: Chih-Hsiang Wu, Tao-Yuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1181 days.

(21) Appl. No.: 11/944,431

(22) Filed: Nov. 22, 2007

(65) Prior Publication Data

US 2008/0069142 A1 Mar. 20, 2008

Related U.S. Application Data

(63) Continuation-in-part of application No. 11/164,250, filed on Nov. 16, 2005, now abandoned.

(51) Int. Cl.
- *H04J 3/24* (2006.01)
- *H04B 7/00* (2006.01)
- *H04L 12/56* (2006.01)
- *H04W 24/00* (2009.01)
- *H04W 36/00* (2009.01)

(52) U.S. Cl. ........ 370/349; 370/310; 370/392; 455/424; 455/436; 714/746

(58) Field of Classification Search .................. 370/349, 370/310, 392; 455/424, 436; 714/746
See application file for complete search history.

(56) References Cited

U.S. PATENT DOCUMENTS

| | | | |
|---|---|---|---|
| 6,643,813 B1 | 11/2003 | Johansson | |
| 6,697,331 B1 | 2/2004 | Riihinen | |
| 6,922,393 B2 | 7/2005 | Jiang | |
| 6,978,382 B1 | 12/2005 | Bender | |
| 7,054,270 B2 | 5/2006 | Yi | |
| 7,197,145 B2 | 3/2007 | Yi | |
| 2002/0042270 A1 | 4/2002 | Yi | |
| 2003/0093739 A1 | 5/2003 | Han | |
| 2003/0095519 A1 | 5/2003 | Kuo et al. | |
| 2003/0206534 A1* | 11/2003 | Wu | 370/328 |

(Continued)

FOREIGN PATENT DOCUMENTS

EP 1085771 3/2001

(Continued)

OTHER PUBLICATIONS

Packet Data Convergence Protocol (PDCP) specification, Mar. 2005.

(Continued)

*Primary Examiner* — Ariel Balaoing
(74) *Attorney, Agent, or Firm* — Winston Hsu; Scott Margo

(57) ABSTRACT

A method of transmitting downlink data after re-establishment of a universal terrestrial radio access network (UTRAN) acknowledged mode (AM) radio link control (RLC) entity includes receiving a plurality of RLC service data units (SDUs) from a packet data convergence protocol (PDCP) layer of the UTRAN; dividing the received RLC SDUs into RLC protocol data units (PDUs) and transmitting the RLC PDUs to a user equipment (UE); receiving acknowledgments from the UE for received RLC PDUs; receiving a re-establishment request at a transmitting side of the AM RLC entity from upper layers of the UTRAN; discarding all RLC SDUs that have been fully transmitted to the UE before the re-establishment request is received; and discarding all RLC SDUs that have not been fully transmitted to the UE when the re-establishment request is received.

4 Claims, 6 Drawing Sheets

U.S. PATENT DOCUMENTS

| | | |
|---|---|---|
| 2003/0210676 A1 | 11/2003 | Wu |
| 2004/0160925 A1 | 8/2004 | Heo |
| 2005/0201337 A1 | 9/2005 | Heo |

FOREIGN PATENT DOCUMENTS

| | | |
|---|---|---|
| EP | 1169804 | 1/2002 |
| EP | 1311081 | 5/2003 |
| EP | 1361706 | 11/2003 |
| EP | 1788751 A1 | 5/2007 |
| EP | 1364482 | 9/2007 |
| TW | 453066 | 9/2001 |
| TW | 490949 | 6/2002 |
| TW | 527797 | 4/2003 |
| TW | 546955 | 8/2003 |
| TW | 552779 | 9/2003 |
| TW | I220831 | 9/2004 |
| TW | I221376 | 9/2004 |
| TW | 200534650 | 10/2005 |
| WO | 0062468 | 10/2000 |
| WO | 2005081465 | 9/2005 |

OTHER PUBLICATIONS

Radio Link Control (RLC) protocol specification, Mar. 2005.

"3rd Generation Partnership Project; Technical Specification Group Radio Access Network; Radio Link Control(RLC) protocol specification(Release 6)", 3GPP TS 25.322, XP-002376362, Sep. 2005, pp. 1-84, V6.5.0, 3GPP Organizational Partners, France.

"3GPP TSG RAN2#49, R2-052784, XP-002376364", Nov. 7-11, 2005, CR pp. 1-3, V6.5.0, Seoul, Korea.

"3GPP TSG RAN2#49, R2-053039, XP-002376363", Nov. 7-11, 2005, CR pp. 1-4, V6.5.0, Seoul, Korea.

Office action mailed on Mar. 8, 2012 for the Taiwan application No. 096145194, filed Nov. 28, 2007, p. 1-11.

* cited by examiner

METHOD FOR HANDLING RADIO BEARER MESSAGES DURING RESET AND REESTABLISHMENT IN A WIRELESS SYSTEM

CROSS REFERENCE TO RELATED APPLICATIONS

This application is a continuation-in-part (CIP) of application Ser. No. 11/164,250, filed on Nov. 16, 2005 and now abandoned, entitled "Method of Handling RLC SDUs During RLC Reset and RLC Re-establishment in a UMTS System," the contents of which are incorporated herein by reference.

BACKGROUND OF THE INVENTION

1. Field of the Invention

The present invention relates to methods for handling messages after reset and reestablishment in wireless systems, and more particularly, to a method for handling radio resource control (RRC) radio bearer 3 (RB3) messages after re-establishment due to SRNS relocation in an acknowledged mode (AM) radio link control (RLC) entity that belongs to RB3.

2. Description of the Prior Art

In a universal mobile telecommunications system (UMTS), a universal terrestrial radio access network (UTRAN) communicates with a plurality of mobile stations, also referred to as user equipment (UE). FIG. 1 is a diagram illustrating network layers of the UMTS protocol. Layers of a UE 10 and a UTRAN 20 are shown. Both the UE 10 and the UTRAN 20 are illustrated having the same network layers. Level 3 layers contain both a packet data convergence protocol (PDCP) layer and a radio resource control (RRC) layer. Level 2 layers contain both a radio link control (RLC) layer and a media access control (MAC) layer. Level 1 contains a physical layer. These layers are all well known to those skilled in the art, and will only be described as they relate to the present invention.

The present invention primarily concerns interaction between the PDCP layer and the RLC layer, as well as interaction between the RRC layer and the RLC layer. The terms service data unit (SDU) and protocol data unit (PDU) are well known in the art. The terms PDU and SDU are relative with respect to the current layer being described. An SDU is a piece of information received from a layer above the current layer for transmission using the service of the current layer. A PDU is a piece of information processed by the current layer. Please refer to FIG. 2. FIG. 2 is a diagram illustrating PDCP PDUs 30, 32 being segmented into RLC PDUs 34, 36, 38 according to the prior art. The RLC receives PDCP PDUs as RLC SDUs and segments the RLC SDUs into RLC PDUs. For simplicity, packet headers are ignored in this diagram. The size of each RLC PDU 34, 36, 38 is configured by the UTRAN 20, whereas the size of each PDCP PDU 30, 32 is not set by the UTRAN 20. As shown in FIG. 2, a first PDCP PDU 30 is segmented to produce RLC PDUs 34 and 36 and part of RLC PDU 38. Since there is still room in the RLC PDU 38 for more data, part of the PDCP PDU 32 data is also added to the RLC PDU 38. This segmentation process continues for dividing all PDCP PDUs into RLC PDUs.

In acknowledged mode (AM) transmission and reception, each time an AM RLC entity sends a PDU, a corresponding acknowledgement should be received from the AM RLC entity receiving the PDU. For radio bearers that are configured to support lossless SRNS relocation, when the SRNS relocation is performed, the transmitting side of the AM RLC entity is re-established. Further, for radio bearers configured to support lossless downlink RLC PDU size change, occasionally the UTRAN 20 will change the size of the downlink RLC PDU segment size. In this case, upper layers will also request the transmitting side of the UTRAN AM RLC entity to be re-established. Please refer to FIG. 3. FIG. 3 illustrates a situation in which the UTRAN AM RLC entity is re-established. The UTRAN PDCP entity submits PDCP data PDUs 40-43 with sequence numbers (SNs) equaling 77, 78, 79, and 80 to the UTRAN AM RLC entity. The UTRAN AM RLC entity then begins transmitting the PDCP data PDUs to the UE 10. When the SRNS relocation is performed, or when the downlink RLC PDU size is changed by the UTRAN 20, the transmitting side of the UTRAN AM RLC entity is re-established. At this time, the PDCP Data PDUs 40, 41 with SNs=77 and 78 have been transmitted by the transmitting side of UTRAN AM RLC entity but have not been acknowledged positively. According to the prior art, when the transmitting side of the UTRAN AM RLC entity is re-established, the AM RLC entity discards all RLC SDUs that have been transmitted completely in the transmitting side. This means that RLC SDUs containing data for the PDCP Data PDUs 40, 41 with SN=77 and 78 are discarded. At this point the PDCP Data PDUs 42, 43 with SNs=79 and 80 have not been transmitted by the transmitting side of UTRAN AM RLC entity. These PDCP Data PDUs 42, 43 are put in a buffer for later transmission.

Due to the re-establishment, the AM RLC entity re-segments the SDUs that were not discarded into AM data (AMD) PDUs with the configured RLC PDU size (which may be different from the size before the re-establishment) so an RLC SDU containing PDCP Data PDU 42 with SN=79 and an RLC PDU containing PDCP PDU 43 with SN=80 are re-segmented. If the PDCP entity in the UTRAN 20 has to trigger a PDCP SN synchronization procedure, it submits one PDCP SeqNum PDU 44 to lower layers. Because the smallest unacknowledged SN is 77, the PDCP entity submits a PDCP SeqNum PDU 44 with SN=77 containing the same data as the PDCP Data PDU 40 with SN=77. PDCP Data PDUs 45, 46, 47 with SN=78, 79, and 80 are also submitted to the AM RLC entity again.

Unfortunately, since the PDCP Data PDUs 42, 43 with SNs=79 and 80 were not discarded during re-establishment, they were put in a buffer for later transmission. That means when the UTRAN AM RLC entity later submits PDCP SeqNum PDU 44 with SN=77 and PDCP Data PDUs 45, 46, 47 with SN=78, 79, and 80, PDCP data PDUs with SN=79 and 80 are transmitted twice. Not only does this waste radio resources by transmitting PDUs twice, it also disrupts the delivery sequence of the PDCP data PDUs since the SNs=79 and 80 are sent from the buffer before the SNs=77-80 are sent after re-establishment.

Please continue to refer to FIG. 3. The same problem described above that applies to re-establishment also applies to RLC reset events. Consider again the situation for a radio bearer that is either configured to support the SRNS relocation or configured to support lossless downlink RLC PDU size change. The UTRAN PDCP entity submits PDCP data PDUs 40-43 with SNs equaling 77, 78, 79, and 80 to the UTRAN AM RLC entity. The UTRAN AM RLC entity then begins transmitting the PDCP data PDUs to the UE 10. If a condition of RLC reset is fulfilled, the RLC reset procedure is triggered. At this time, the PDCP Data PDUs 40, 41 with SNs=77 and 78 have been transmitted by the transmitting side of UTRAN AM RLC entity but have not been acknowledged positively. According to the prior art, when the UTRAN AM RLC entity is reset, the AM RLC entity discards all RLC SDUs that have been transmitted completely in the transmitting side. This means that RLC SDUs containing data for the PDCP Data PDUs 40, 41 with SN=77 and 78 are discarded. At this point the PDCP Data PDUs 42, 43 with SNs=79 and 80 have not been transmitted by the transmitting side of UTRAN AM RLC entity. These PDCP Data PDUs 42, 43 are put in a buffer for later transmission.

Next, the PDCP entity in the UTRAN 20 triggers a PDCP SN synchronization procedure by submitting one PDCP SeqNum PDU 44 to lower layers. Because the smallest unacknowledged SN is 77, the PDCP entity submits a PDCP SeqNum PDU 44 with SN=77 containing the same data as the PDCP Data PDU 40 with SN=77. PDCP Data PDUs 45, 46, 47 with SN=78, 79, and 80 are also submitted to the AM RLC entity again.

Unfortunately, no handling method is specified for the RLC SDUs that were not transmitted before the reset in the transmitting side of the UTRAN AM RLC entity. If the PDCP Data PDUs 42, 43 with SNs=79 and 80 were not discarded during the reset, they were put in a buffer for later transmission. That means when the UTRAN AM RLC entity later submits PDCP SeqNum PDU 44 with SN=77 and PDCP Data PDUs 45, 46, 47 with SN=78, 79, and 80, PDCP data PDUs with SN=79 and 80 are transmitted twice. Not only does this waste radio resources by transmitting PDUs twice, it also disrupts the delivery sequence of the PDCP data PDUs since the SNs=79 and 80 are sent from the buffer before the SNs=77-80 are sent after the reset.

Please refer to FIG. 4. FIG. 4 illustrates a situation in which the UTRAN AM RLC entity belonging to RB3 is re-established. Consider RRC signaling radio bearer RB3. The RRC submits RB3 messages 1 and 2 50, 51 to the RLC. When the RB3 RLC is re-established due to SRNS relocation, the RRC RB3 message 1 50 has been transmitted but is not positively acknowledged. RRC RB3 message 2 51 has not been transmitted. After RLC re-establishment, the RRC retransmits the RB3 messages 1 and 2 52, 53. However, the RB3 RLC also keeps the RRC RB3 message 2, and may keep the RRC RB3 message 1. Therefore, the RRC RB3 messages 1 and 2 are duplicated in the buffer, and will be transmitted twice. This causes unnecessary retransmissions, and wastes radio resources.

Likewise, FIG. 4 also illustrates a situation in which the UE AM RLC entity belonging to RB3 is re-established. Consider RRC signaling radio bearer RB3. The RRC submits RB3 messages 1 and 2 50, 51 to the RLC. When the RB3 RLC is re-established due to SRNS relocation, the RRC RB3 message 1 50 has been transmitted, but is not positively acknowledged. RRC RB3 message 2 51 has not been transmitted. After RLC re-establishment, the RRC retransmits the RB3 messages 1 and 2 52, 53. However, the RB3 RLC also keeps the RRC RB3 message 2, and may keep the RRC RB3 message 1. Therefore, the RRC RB3 messages 1 and 2 are duplicated in the buffer, and will be transmitted twice. This causes unnecessary retransmissions, and wastes radio resources.

The prior art also suffers from other problems because the proper handling for certain situations is not specified. For instance, the lossless function is not provided for uplink transmission in a UE PDCP entity for a radio bearer configured to support lossless DL RLC PDU size change. The handling for RLC SDUs that have not been transmitted completely before RLC re-establishment is not specified clearly in the specification. Therefore, a bad design, such as discarding RLC SDUs that have not been transmitted completely before the RLC re-establishment, will introduce transmission delays because the discarded RLC SDUs have to be recovered by upper layer retransmission.

Similarly, the handling for RLC SDUs that have not been transmitted completely before RLC reset is not specified clearly in the specification. Therefore, a bad design, such as discarding RLC SDUs that have not been transmitted completely before the RLC reset, will introduce transmission delays because the discarded RLC SDUs have to be recovered by upper layer retransmission.

SUMMARY OF THE INVENTION

It is therefore an objective of the present invention to provide methods for transmitting downlink and uplink data after re-establishment and reset of a UTRAN AM RLC entity for solving the problems described above.

According to an embodiment of the present invention, a method of transmitting downlink data after re-establishment of a universal terrestrial radio access network (UTRAN) acknowledged mode (AM) radio link control (RLC) entity includes receiving a plurality of RLC service data units (SDUs) from a packet data convergence protocol (PDCP) layer of the UTRAN; dividing the received RLC SDUs into RLC protocol data units (PDUs) and transmitting the RLC PDUs to a user equipment (UE); receiving acknowledgments from the UE for received RLC PDUs; receiving a re-establishment request at a transmitting side of the AM RLC entity from upper layers of the UTRAN; discarding all RLC SDUs that have been fully transmitted to the UE before the re-establishment request is received; and discarding all RLC SDUs that have not been fully transmitted to the UE when the re-establishment request is received.

According to another exemplary embodiment of the present invention, a method of transmitting downlink data after reset of a UTRAN AM RLC entity includes receiving a plurality of RLC SDUs from a PDCP layer of the UTRAN; dividing the received RLC SDUs into RLC PDUs and transmitting the RLC PDUs to a UE; receiving acknowledgments from the UE for received RLC PDUs; receiving a reset command at the AM RLC entity for resetting the AM RLC entity; discarding all RLC SDUs that have been fully transmitted to the UE before the reset occurs; and discarding all RLC SDUs that have not been fully transmitted to the UE when the reset occurs.

According to yet another embodiment of the present invention, a method of transmitting radio bearer messages after re-establishment of an acknowledged mode (AM) radio link control (RLC) entity comprises receiving a plurality of radio bearer messages from a radio resource control (RRC) layer, transmitting the radio bearer messages to a peer RLC entity, receiving acknowledgments from the peer RLC entity for received radio bearer messages, receiving a re-establishment request at a transmitting side of the AM RLC entity from upper layers, discarding all radio bearer messages that have been fully transmitted before the re-establishment request is received, and discarding all radio bearer messages that have not been fully transmitted when the re-establishment request is received.

According to another embodiment of the present invention, a method of transmitting radio bearer messages after reset of an acknowledged mode (AM) radio link control (RLC) entity comprises receiving a plurality of radio bearer messages from a radio resource control (RRC) layer, transmitting the radio bearer messages to a peer RLC entity, receiving acknowledgments from the peer RLC entity for received radio bearer messages, receiving a reset command at the AM RLC entity from the peer RLC entity for resetting the AM RLC entity, discarding all radio bearer messages that have been fully transmitted before the re-establishment request is received, and discarding all radio bearer messages that have not been fully transmitted when the re-establishment request is received.

According to yet another embodiment of the present invention, a method of transmitting radio bearer messages after re-establishment of a user equipment (UE) acknowledged mode (AM) radio link control (RLC) entity comprises receiving a plurality of radio bearer messages from a radio resource control (RRC) layer of the UE, transmitting the radio bearer messages to a universal terrestrial radio access network (UTRAN), receiving acknowledgments from the UTRAN for received radio bearer messages, receiving a re-establishment request at a transmitting side of the AM RLC entity from upper layers of the UE, discarding all radio bearer messages that have been fully transmitted to the UTRAN before the re-establishment request is received, and discarding all radio bearer messages that have not been fully transmitted to the UTRAN when the re-establishment request is received.

According to the present invention, a method of transmitting radio bearer messages after reset of a user equipment (UE) acknowledged mode (AM) radio link control (RLC) entity comprises receiving a plurality of radio bearer messages from a radio resource control (RRC) layer of the UE, transmitting the radio bearer messages to a user universal terrestrial radio access network (UTRAN), receiving acknowledgments from the UTRAN for received radio bearer messages, receiving a reset command at the AM RLC entity for resetting the AM RLC entity, discarding all radio bearer messages that have been fully transmitted to the UTRAN before the reset occurs, and discarding all radio bearer messages that have not been fully transmitted to the UTRAN when the reset occurs.

According to the present invention, a method of transmitting downlink data after re-establishment of a universal terrestrial radio access network (UTRAN) acknowledged mode (AM) radio link control (RLC) entity comprises receiving a plurality of RLC service data units (SDUs) from a packet data convergence protocol (PDCP) layer of the UTRAN, dividing the received RLC SDUs into RLC protocol data units (PDUs) and transmitting the RLC PDUs to a user equipment (UE), receiving acknowledgments from the UE for received RLC PDUs, receiving a re-establishment request at a transmitting side of the AM RLC entity from upper layers of the UTRAN, discarding all RLC SDUs that have been fully transmitted to the UE before the re-establishment request is received, and keeping all RLC SDUs that have not been fully transmitted to the UE when the re-establishment request is received and retransmitting the RLC SDUs that were not fully transmitted after the re-establishment of the transmitting side of the AM RLC entity if the UTRAN AM RLC entity does not support lossless SRNS relocation and lossless downlink RLC PDU size changes.

According to the present invention, a method of transmitting downlink data after reset of a universal terrestrial radio access network (UTRAN) acknowledged mode (AM) radio link control (RLC) entity comprises receiving a plurality of RLC service data units (SDUs) from a packet data convergence protocol (PDCP) layer of the UTRAN, dividing the received RLC SDUs into RLC protocol data units (PDUs) and transmitting the RLC PDUs to a user equipment (UE), receiving acknowledgments from the UE for received RLC PDUs, receiving a reset command at the AM RLC entity for resetting the AM RLC entity, discarding all RLC SDUs that have been fully transmitted to the UE before the reset occurs, and keeping all RLC SDUs that have not been fully transmitted to the UE when the reset occurs and retransmitting the RLC SDUs that were not fully transmitted after the AM RLC entity is reset if the UTRAN AM RLC entity does not support lossless SRNS relocation and lossless downlink RLC PDU size changes.

It is an advantage of the present invention that resources are saved by not retransmitting data twice and that transmission delays are reduced by not forcing discarded RLC SDUs to be recovered through upper layer retransmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
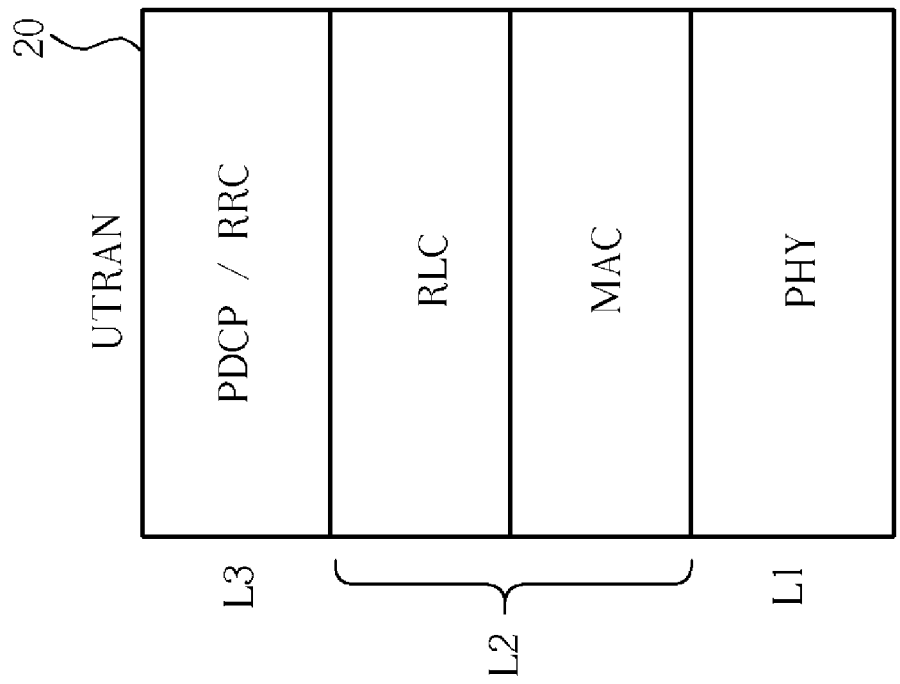
FIG. 1 is a diagram illustrating protocol layers between UE and UTRAN.
Figure 1:
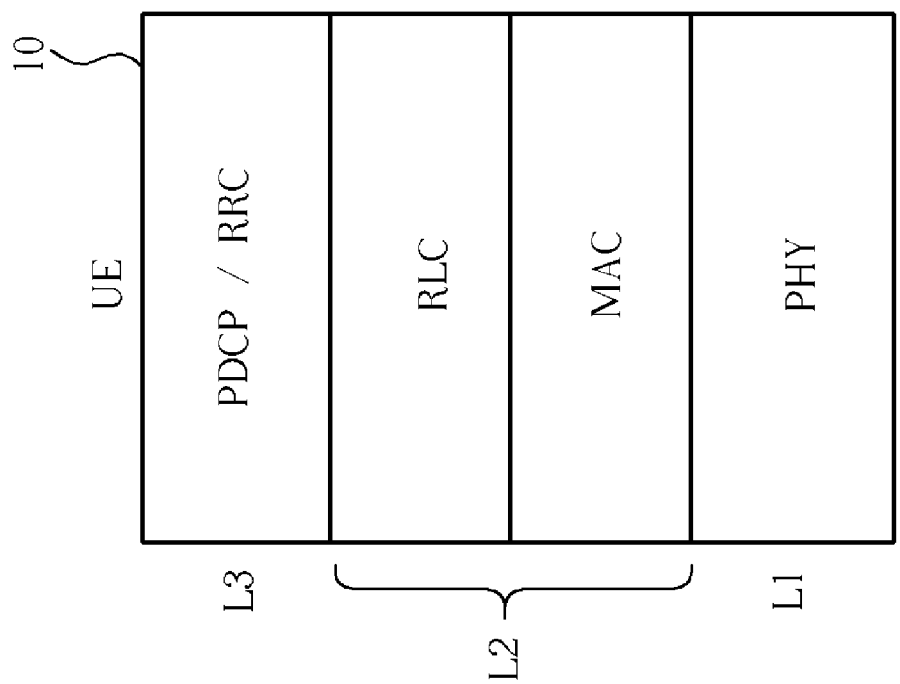
Figure 2:
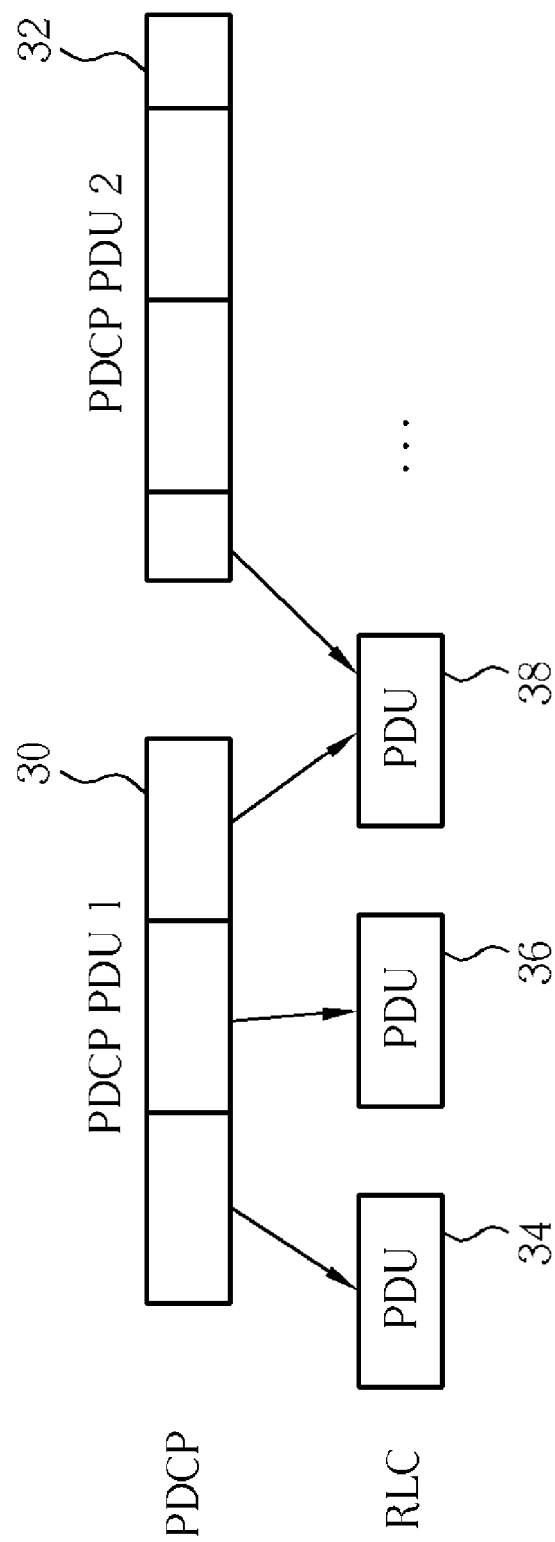
FIG. 2 is a diagram illustrating PDCP PDUs being segmented into RLC PDUs according to the prior art.
Figure 3:
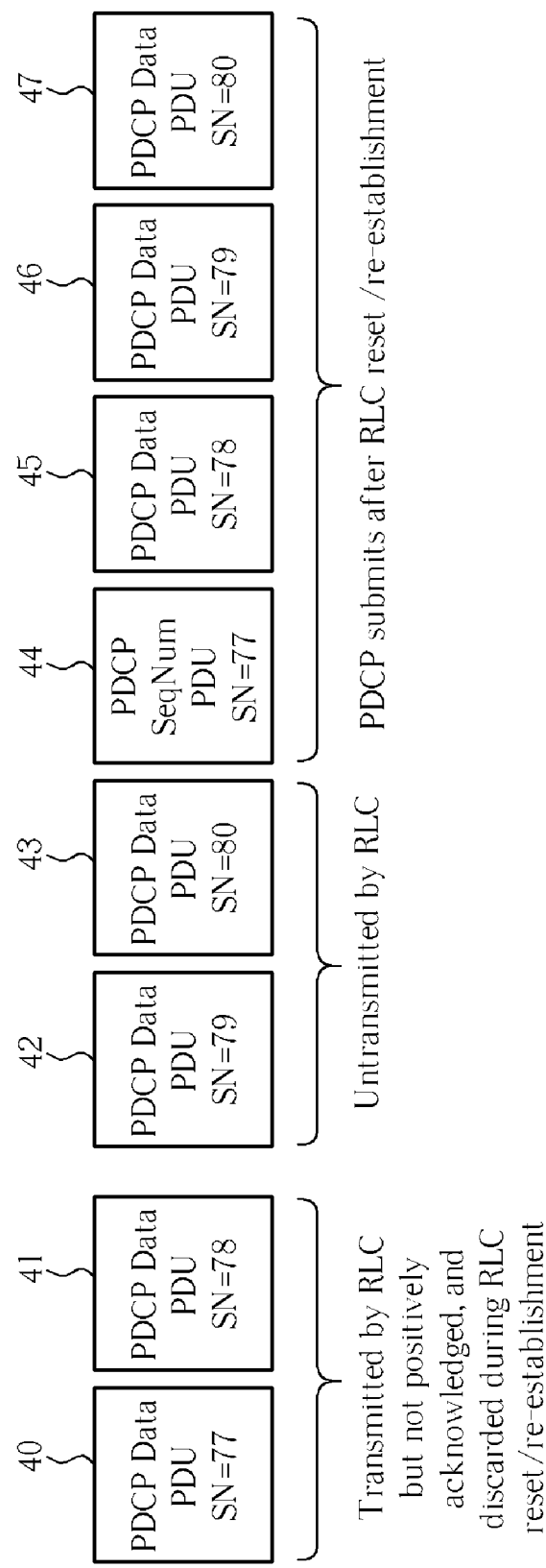
FIG. 3 illustrates a situation in which the UTRAN AM RLC entity is re-established.
Figure 4:
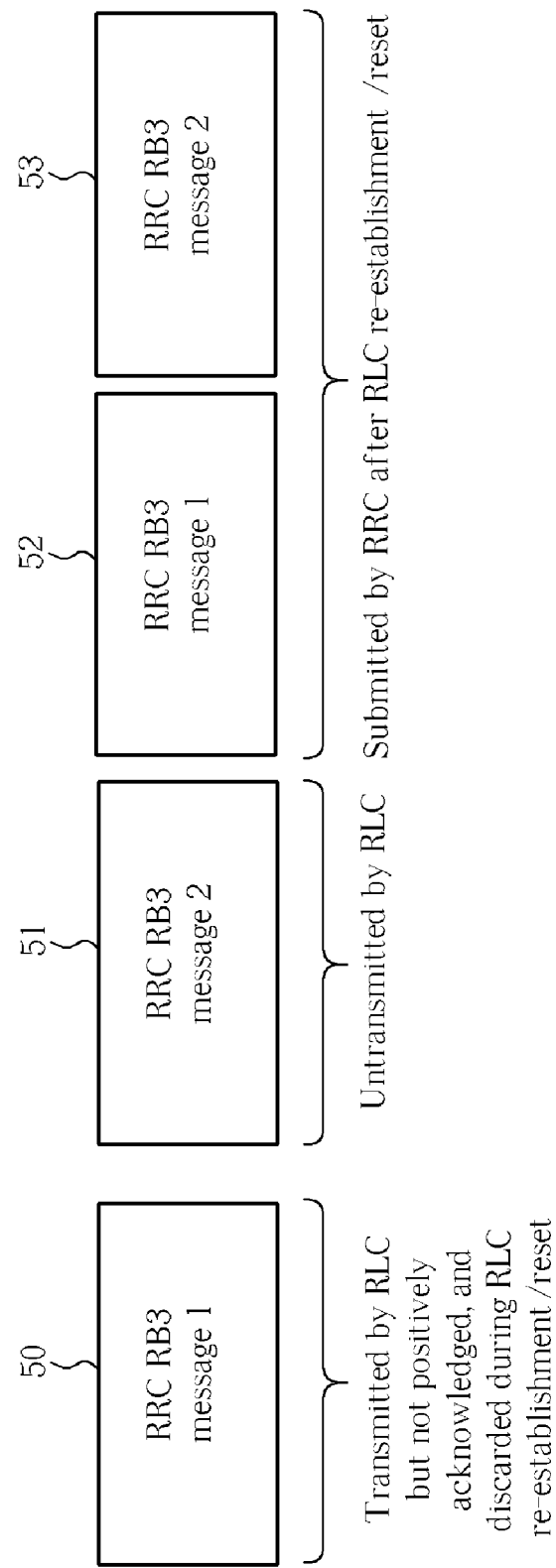
FIG. 4 illustrates a situation in which the UE/UTRAN AM RLC entity belonging to RB3 is re-established.
Figure 5:
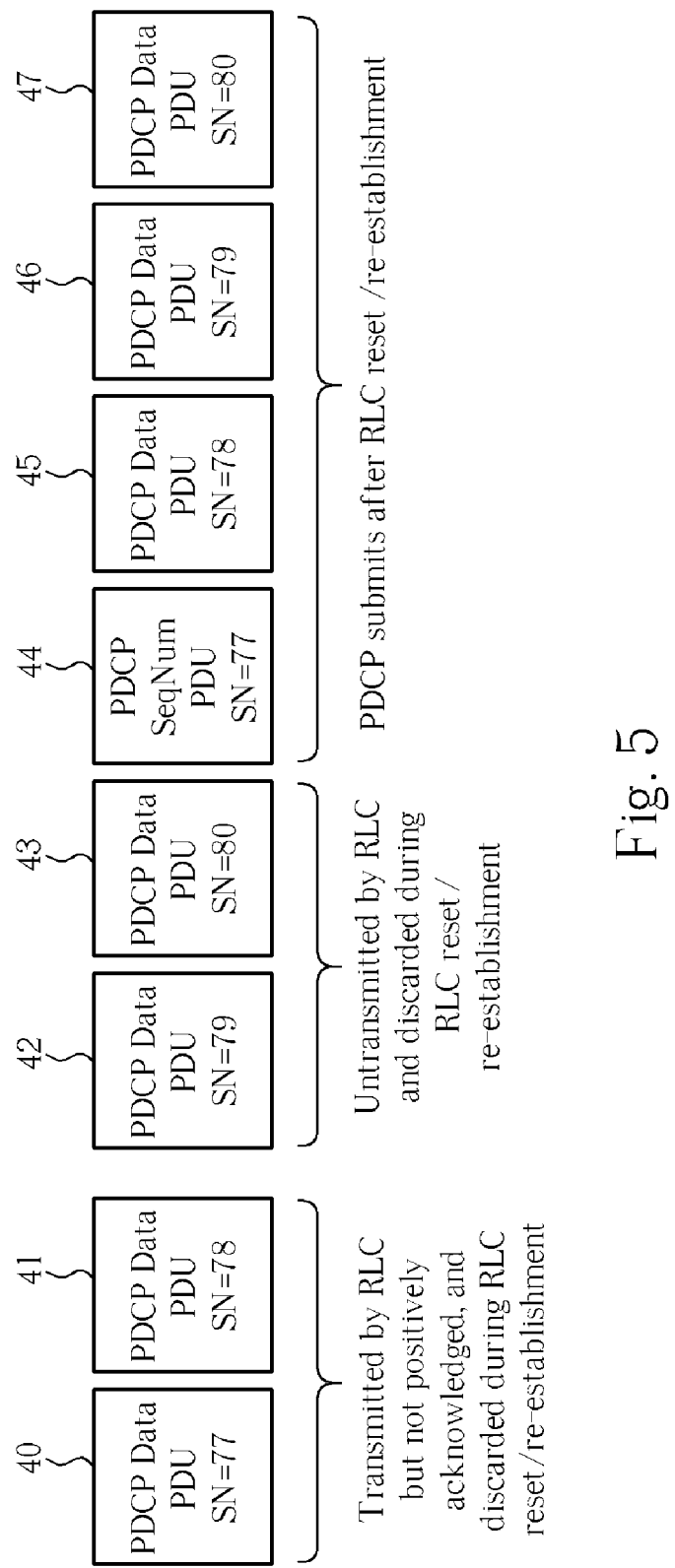
FIG. 5 illustrates a situation in which the UTRAN AM RLC entity is re-established according to the present invention.

Please refer to FIG. 5. FIG. 5 illustrates a situation in which the UTRAN AM RLC entity is re-established according to the present invention. The present invention method of handling the re-establishment is an improvement upon the prior art method, and the same reference numbers will be used in FIG. 5 and FIG. 3, and the same reference numbers will be used in FIG. 6 and FIG. 4, for convenience.

The UTRAN PDCP entity submits PDCP data PDUs 40-43 with sequence numbers (SNs) equaling 77, 78, 79, and 80 to the UTRAN AM RLC entity. The UTRAN AM RLC entity then begins transmitting the PDCP data PDUs to the UE 10. When the downlink RLC PDU size is changed by the UTRAN 20, or when the SRNS relocation is performed, the transmitting side of the UTRAN AM RLC entity is re-established. At this time, the PDCP Data PDUs 40, 41 with SNs=77 and 78 have been transmitted by the transmitting side of UTRAN AM RLC entity but have not been acknowledged positively. Like the prior art, the present invention method also has the AM RLC entity discard all RLC SDUs that have been transmitted completely in the transmitting side when the transmitting side of the UTRAN AM RLC entity is re-established. Differing from the prior art, the present invention also discards the RLC SDUs that were not transmitted before the re-establishment in the transmitting side of the UTRAN AM RLC entity. Therefore, RLC SDUs containing data for the PDCP Data PDUs 40-43 with SN=77-80 are discarded.

If the PDCP entity in the UTRAN 20 has to trigger a PDCP SN synchronization procedure, it submits one PDCP SeqNum PDU 44 to lower layers. Because the smallest unacknowledged SN is 77, the PDCP entity submits a PDCP SeqNum PDU 44 with SN=77 containing the same data as the PDCP Data PDU 40 with SN=77. PDCP Data PDUs 45, 46, 47 with SN=78, 79, and 80 are also submitted to the AM RLC entity.

Since the RLC SDUs containing data for the PDCP Data PDUs 42, 43 with SN=79, 80 are discarded during re-establishment, they are not placed in a buffer for later transmission. Thus, the PDCP Data PDUs with SN=79 and 80 are only transmitted to the UE 10 one time instead of two, and the in-sequence delivery is properly maintained in the UE AM RLC entity.

Please continue to refer to FIG. 5. The present invention handling method that is applied to re-establishment can also be applied to RLC reset events. The UTRAN PDCP entity submits PDCP data PDUs 40-43 with SNs equaling 77, 78, 79, and 80 to the UTRAN AM RLC entity. The UTRAN AM RLC entity then begins transmitting the PDCP data PDUs to the UE 10. If a condition of RLC reset is fulfilled, the RLC reset procedure is triggered. This reset state can be triggered by either a RESET PDU or a RESET acknowledge (ACK) PDU. At this time, the PDCP Data PDUs 40, 41 with SNs=77 and 78 have been transmitted by the transmitting side of UTRAN AM RLC entity but have not been acknowledged positively. Like the prior art, the present invention method also has the AM RLC entity discard all RLC SDUs that have been transmitted completely in the transmitting side when the transmitting side of the UTRAN AM RLC entity is reset. Differing from the prior art, the present invention also discards the RLC SDUs that were not transmitted before the reset in the UTRAN AM RLC entity. Therefore, RLC SDUs containing data for the PDCP Data PDUs 40-43 with SN=77-80 are discarded.

Next, the PDCP entity in the UTRAN 20 triggers a PDCP SN synchronization procedure by submitting one PDCP SeqNum PDU 44 to lower layers. Because the smallest unacknowledged SN is 77, the PDCP entity submits a PDCP SeqNum PDU 44 with SN=77 containing the same data as the PDCP Data PDU 40 with SN=77. PDCP Data PDUs 45, 46, 47 with SN=78, 79, and 80 are also submitted to the AM RLC entity.

Since the RLC SDUs containing data for the PDCP Data PDUs 42, 43 with SN=79, 80 are discarded during reset, they are not placed in a buffer for later transmission. Thus, the PDCP Data PDUs with SN=79 and 80 are only transmitted to the UE 10 one time instead of two, and the in-sequence delivery is properly maintained in the UE AM RLC entity.

Figure 6:
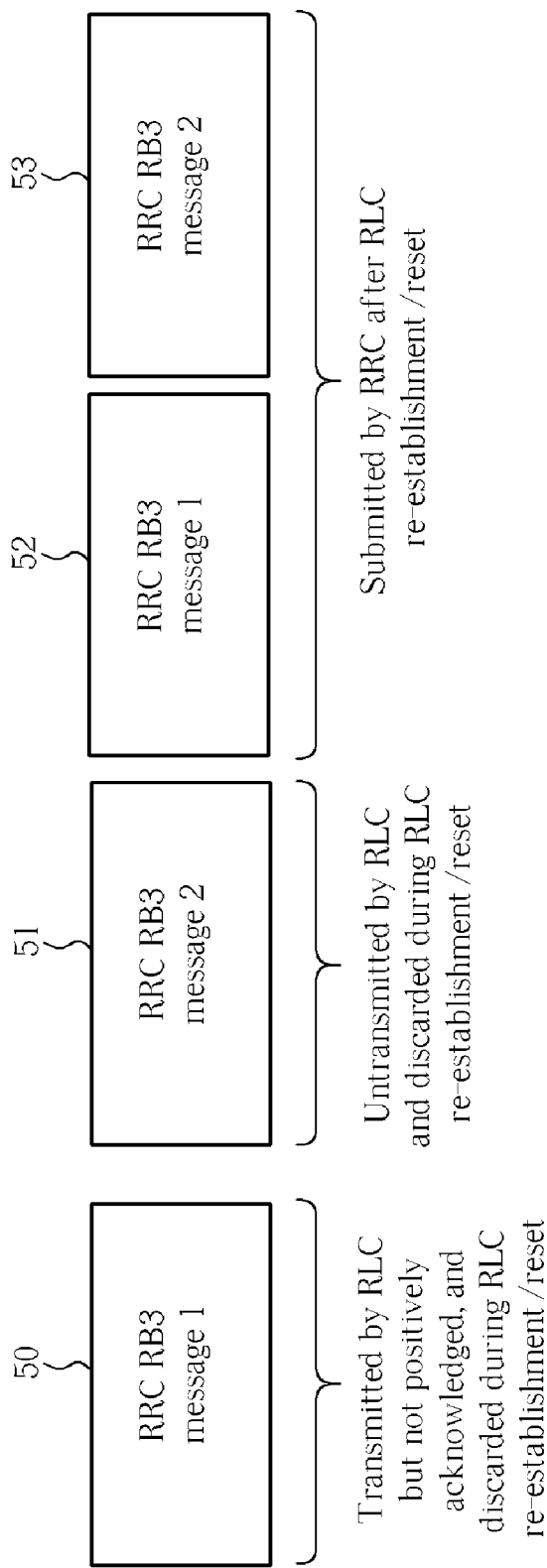
FIG. 6 illustrates a situation in which the UE/UTRAN AM RLC entity belonging to RB3 is re-established according to the present invention.

Please refer to FIG. 6. FIG. 6 illustrates a situation in which the UTRAN AM RLC entity belonging to RB3 is re-established or reset according to the present invention. The UTRAN RRC entity submits RRC RB3 messages 50, 51 to the UTRAN AM RLC entity. The UTRAN AM RLC entity then begins transmitting the RRC RB3 messages to the UE 10, i.e. a peer entity of the UTRAN AM RLC entity. When the RB3 RLC is re-established due to SRNS relocation, or when the RB3 RLC is reset, triggered by a RESET PDU or a RESET ACK PDU, the transmitting side of the UTRAN AM RLC entity is re-established or reset, respectively. At this time, the RRC RB3 message 50 has been transmitted by the transmitting side of UTRAN AM RLC entity but has not been acknowledged positively. Like the prior art, the present invention method also has the AM RLC entity discard all RRC RB3 messages that have been transmitted completely in the transmitting side when the transmitting side of the UTRAN AM RLC entity is re-established or reset. Differing from the prior art, the present invention also discards the RRC RB3 messages that were not transmitted before the re-establishment or reset in the transmitting side of the UTRAN AM RLC entity. Therefore, the RRC RB3 message 2 51 is also discarded.

Since the RRC RB3 messages are discarded during re-establishment or reset, they are not placed in a buffer for later transmission. Thus, the RRC RB3 messages are only transmitted to the UE 10 one time instead of two, and radio resources are not wasted in the UE and UTRAN.

Likewise, FIG. 6 further illustrates a situation in which the UE AM RLC entity belonging to RB3 is re-established or reset according to the present invention. The UE RRC entity submits RRC RB3 messages 50, 51 to the UE AM RLC entity. The UE AM RLC entity then begins transmitting the RRC RB3 messages to the UTRAN 20, i.e. a peer entity of the UE AM RLC entity. When the RB3 RLC is re-established due to SRNS relocation, or when the RB3 RLC is reset, triggered either by a RESET PDU or a RESET ACK PDU, the transmitting side of the UE AM RLC entity is re-established or reset, respectively. At this time, the RRC RB3 message 50 has been transmitted by the transmitting side of UE AM RLC entity but has not been acknowledged positively. Like the prior art, the present invention method also has the AM RLC entity discard all RRC RB3 messages that have been transmitted completely in the transmitting side when the transmitting side of the UE AM RLC entity is re-established or reset. Differing from the prior art, the present invention also discards the RRC RB3 messages that were not transmitted before the re-establishment or reset in the transmitting side of the UE AM RLC entity. Therefore, the RRC RB3 message 2 51 is also discarded.

Since the RRC RB3 messages are discarded during re-establishment or reset, they are not placed in a buffer for later transmission. Thus, the RRC RB3 messages are only transmitted to the UTRAN 20 one time instead of two, and radio resources are not wasted in the UE and UTRAN.

The present invention also specifies a handling method for uplink transmission in a UE PDCP entity for a radio bearer configured to support lossless DL RLC PDU size change. The handling for RLC SDUs that have not been transmitted completely before RLC re-establishment is performed as follows. The AM RLC entity in the UE 10 discards all RLC SDUs that have been transmitted completely before the RLC re-establishment. However, all of the RLC SDUs that have not been transmitted completely before the RLC re-establishment are not discarded and are re-segmented into AMD PDUs by the UE 10 after the reset is performed successfully. Therefore, transmission delays are reduced with the present invention method since the RLC SDUs that were not been transmitted completely before the RLC re-establishment do not have to be recovered through upper layer transmission if they were discarded.

The same handling method can also be applied to a reset applied to a UE PDCP entity performing uplink transmission for a radio bearer configured to support lossless DL RLC PDU size change. That is, the AM RLC entity in the UE 10 discards all RLC SDUs that have been transmitted completely before the RLC reset. However, all of the RLC SDUs that have not been transmitted completely before the RLC reset are not discarded and are re-segmented into AMD PDUs by the UE 10 after the reset is performed successfully.

In summary, the present invention handling methods save resources by not retransmitting data twice and avoid transmission delays by not forcing discarded RLC SDUs to be recovered through upper layer retransmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting downlink data after re-establishment of a universal terrestrial radio access network (UTRAN) acknowledged mode (AM) radio link control (RLC) entity, the method comprising:
   receiving a plurality of RLC service data units (SDUs) from a packet data convergence protocol (PDCP) layer of the UTRAN;
   dividing the received RLC SDUs into RLC protocol data units (PDUs) and transmitting the RLC PDUs to a user equipment (UE);
   receiving acknowledgments from the UE for received RLC PDUs;
   receiving a re-establishment request at a transmitting side of the AM RLC entity from upper layers of the UTRAN;
   discarding all RLC SDUs that have been fully transmitted to the UE before the re-establishment request is received;
   keeping all RLC SDUs that have not been fully transmitted to the UE when the re-establishment request is received and retransmitting the RLC SDUs that were not fully transmitted after the re-establishment of the transmitting side of the AM RLC entity if the UTRAN AM RLC entity does not support lossless downlink RLC PDU size changes; and
   discarding all RLC SDUs that have not been fully transmitted to the UE when the re-establishment request is received if the UTRAN RLC entity supports lossless downlink RLC PDU size changes.

2. A method of transmitting downlink data after reset of a universal terrestrial radio access network (UTRAN) acknowledged mode (AM) radio link control (RLC) entity, the method comprising:
   receiving a plurality of RLC service data units (SDUs) from a packet data convergence protocol (PDCP) layer of the UTRAN;
   dividing the received RLC SDUs into RLC protocol data units (PDUs) and transmitting the RLC PDUs to a user equipment (UE);
   receiving acknowledgments from the UE for received RLC PDUs;
   receiving a reset command at the AM RLC entity for resetting the AM RLC entity;
   discarding all RLC SDUs that have been fully transmitted to the UE before the reset occurs;
   keeping all RLC SDUs that have not been fully transmitted to the UE when the reset occurs and retransmitting the RLC SDUs that were not fully transmitted after the AM RLC entity is reset if the UTRAN AM RLC entity does not support lossless downlink RLC PDU size changes; and
   discarding all RLC SDUs that have not been fully transmitted to the UE when the reset occurs if the UTRAN RLC entity supports lossless downlink RLC PDU size changes.

3. The method of claim 2, wherein the reset command is an RLC RESET PDU.

4. The method of claim 2, wherein the reset command is an RLC RESET acknowledgement (ACK) PDU.

* * * * *